(12) United States Patent
Zhang

(10) Patent No.: US 11,802,677 B2
(45) Date of Patent: Oct. 31, 2023

(54) BACKLIGHT STRUCTURE AND DISPLAY DEVICE

(71) Applicant: TCL CHINA STAR OPTOELECTRONICS TECHNOLOGY CO., LTD., Shenzhen (CN)

(72) Inventor: Yuxiu Zhang, Shenzhen (CN)

(73) Assignee: TCL CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/771,489

(22) PCT Filed: Apr. 13, 2022

(86) PCT No.: PCT/CN2022/086660
§ 371 (c)(1),
(2) Date: Apr. 24, 2022

(65) Prior Publication Data
US 2023/0313971 A1 Oct. 5, 2023

(30) Foreign Application Priority Data
Apr. 1, 2022 (CN) .......................... 202210348561.5

(51) Int. Cl.
*F21V 7/00* (2006.01)
*F21Y 115/10* (2016.01)

(52) U.S. Cl.
CPC .......... *F21V 7/0083* (2013.01); *F21V 7/0033* (2013.01); *F21Y 2115/10* (2016.08)

(58) Field of Classification Search
CPC .. F21V 7/0033; F21V 7/0083; F21Y 2115/10; G02F 1/133602; G02F 1/133603;
(Continued)

(56) References Cited

U.S. PATENT DOCUMENTS 8,430,519 B2 * 4/2013 Takata .............. G02F 1/133606
362/97.3
RE47,656 E 10/2019 Bae et al.
(Continued)

FOREIGN PATENT DOCUMENTS

CN 101424755 A 5/2009
CN 102155681 A 8/2011
(Continued)

OTHER PUBLICATIONS

KR 20160022225, Feb. 29, 2016, Kim et al, English Translation (Year: 2016).*
(Continued)

*Primary Examiner* — Peggy A Neils
(74) *Attorney, Agent, or Firm* — The Roy Gross Law Firm, LLC; Roy Gross

(57) ABSTRACT

The present invention provides a backlight structure and a display device. The backlight structure includes a backplane and backlight sources, and the backlight sources are arranged on the backplane. The backlight structure also includes: an anti-reflection reflective composite structure, which is located on a side of the backplane. The anti-reflection reflective composite structure includes an anti-reflection film and reflection parts, and the reflection parts are formed on a surface of the anti-reflection film facing the backlight sources. The greater a distance between a certain area on the anti-reflection film and a corresponding one of the backlight sources, the smaller a distribution density of the reflection parts located on the area.

18 Claims, 2 Drawing Sheets

(58) Field of Classification Search
CPC ......... G02F 1/133605; G02F 1/133611; G02F 1/133606
See application file for complete search history.

(56) References Cited

U.S. PATENT DOCUMENTS

| | | | |
|---|---|---|---|
| 2011/0051044 A1 | 3/2011 | Segawa | |
| 2013/0063927 A1* | 3/2013 | Lin | G02F 1/133606 362/97.3 |
| 2017/0160591 A1* | 6/2017 | Cho | G02F 1/133606 |
| 2019/0187521 A1* | 6/2019 | Chang | G02F 1/133611 |

FOREIGN PATENT DOCUMENTS

| | | | | |
|---|---|---|---|---|
| CN | 204513110 U | 7/2015 | | |
| CN | 106842391 A | 6/2017 | | |
| CN | 110928038 A | 3/2020 | | |
| CN | 113885252 A | 1/2022 | | |
| CN | 114089561 A | 2/2022 | | |
| CN | 216113547 U | 3/2022 | | |
| JP | 2010272418 A | 12/2010 | | |
| JP | 2018006259 A | 1/2018 | | |
| KR | 20160022225 | * | 2/2016 | ....... G02F 1/133606 |

OTHER PUBLICATIONS

PCT International Search Report for International Application No. PCT/CN2022/086660, dated Dec. 16, 2022, 10pp.

PCT Written Opinion of the International Search Authority for International Application No. PCT/CN2022/086660, dated Dec. 16, 2022, 10pp.

Chinese Office Action issued in corresponding Chinese Patent Application No. 202210348561.5, dated Dec. 2, 2022, pp. 1-7, 18pp.

* cited by examiner

BACKLIGHT STRUCTURE AND DISPLAY DEVICE

CROSS REFERENCE TO RELATED APPLICATIONS

This application is a National Phase of PCT Patent Application No. PCT/CN2022/086660 having International filing date of Apr. 13, 2022, which claims the benefit of priority of Chinese Patent Application No. 202210348561.5, filed Apr. 1, 2022, the contents of which are all incorporated herein by reference in their entirety.

FIELD OF INVENTION

The present invention relates to a field of display, in particular, to a backlight structure and a display device.

DESCRIPTION OF PRIOR ART

Mini LED has advantages of light weight and energy saving, and has become one of the mainstream trends in the display industry. Mini LED generally adopts straight down LED light sources. Light emitted by the light sources will be strong in a center while weak in a surrounding, and a problem of periodic uneven intensity of the light sources in a display will appear.

Technical Problem

In the display of straight down LED light sources, there will be the problem of periodic uneven intensity of the light sources.

SUMMARY

In view of this, the present invention provides a backlight structure and a display device which can improve the periodic uneven intensity of the light sources.

In order to solve the above problems, the technical scheme provided by the present invention is as follows:

In the first aspect, the present invention provides a backlight structure, comprising a backplane and a plurality of backlight sources, and the backlight sources being arranged on the backplane in array; wherein the backlight structure further comprises:

an anti-reflection film, arranged on sides of the plurality of the backlight sources away from the backplane; and a plurality of reflection parts, formed on a surface of the anti-reflection film facing the backlight sources;

wherein, greater a distance between a certain area on the anti-reflection film and a corresponding one of the backlight sources, smaller a distribution density of the reflection parts located on the area.

In an optional embodiment of the present invention,

The anti-reflection film comprises a first area, an Mth area, and an Nth area, the Mth area surrounds the first area, and the Nth area surrounds the Mth area; wherein M and N are positive integers, both M and N are greater than 1, $1<M<N$; a distance between the first area and the backlight sources is less than a distance between the Nth area and the backlight sources and a distance between the Mth area and the backlight sources, and the distance between the Nth area and the backlight sources is greater than or equal to the distance between the Mth area and the backlight sources; and a distribution density of the reflection parts located in the Mth area is greater than or equal to a distribution density of the reflection parts located in the Nth area and is less than a distribution density of the reflection parts located in the first area.

In an optional embodiment of the present invention, the distribution density of the reflection parts located in the Nth area is greater than or equal to 0.

In an optional embodiment of the present invention, distances between any two adjacent of the reflection parts in the reflection parts located in the first area are unequal and defined as d1, and distances between any two adjacent of the reflection parts in the reflection parts located in the Mth area are unequal and defined as d2, distances between any two adjacent of the reflection parts in the reflection parts located in the Nth area are equal and defined as d3, $d3<d2<d1$.

In an optional embodiment of the present invention, a center of the first area is directly opposite to a luminous center of the backlight sources, and distances between any two adjacent of the reflection parts in a direction from an edge of the first area to the center of the first area gradually decrease.

In an optional embodiment of the present invention, distances between any two adjacent of the reflection parts located from an edge of the Mth area to a center of the first area gradually decrease.

In an optional embodiment of the present invention, distances between any two adjacent of the reflection parts in a direction from an edge of the Nth area to a center of the first area gradually decrease.

In an optional embodiment of the present invention, the reflection parts located in at least one area of the first area, the Mth area, and the Nth area are arranged in array.

In an optional embodiment of the present invention, the Nth area is a circular ring, a rectangular ring, or a multilateral ring.

In an optional embodiment of the present invention, the backlight structure further comprises a reflection layer, the reflection layer is arranged on the backplane and is located between the backplane and the backlight sources; alternatively, the reflection layer is arranged on the backplane and surrounds the backlight sources.

In an optional embodiment of the present invention, the reflection parts are protrusions formed on a surface of the anti-reflection film facing the backlight sources, or the reflection parts are concave parts of a surface of the anti-reflection film facing the backlight sources recessed towards the anti-reflection film.

In the second aspect, the present invention further provides a display device, comprising a display panel and a backlight structure as described above, and the display panel is located on a light emitting side of the backlight structure.

The backlight structure and the display device are provided by the present invention. An anti-reflection reflective composite structure is added between the backlight sources and the diffusion plate of the backlight structure, and the anti-reflection reflective composite structure comprises an anti-reflection film and a plurality of reflection parts formed on a surface of the anti-reflection film facing the backlight sources and the reflection layer, and the anti-reflection reflective composite structure comprises a first area and an Nth area, and the Nth area is arranged around the first area. Wherein, N is a positive integer and N is greater than 1. A distance from the first area to the backlight sources is less than a distance from the Nth area to the backlight sources. Since the greater a distance between a certain area on the anti-reflection film and a corresponding one of the backlight sources, the smaller a distribution density of the reflection parts located on the area, therefore, the number of light rays emitted and incident on the reflection parts located in the first area and reflected by the reflection parts to the backplane is more than the number of light rays incident on the reflection parts located in the Nth area and reflected by the reflection parts to the backplane. Hence, the amount of light transmitted from the anti-reflection film located in the first area can be reduced, so that the periodic uneven intensity of the light sources can be relieved.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DETAILED DESCRIPTION OF PREFERRED EMBODIMENTS

Figure 1:
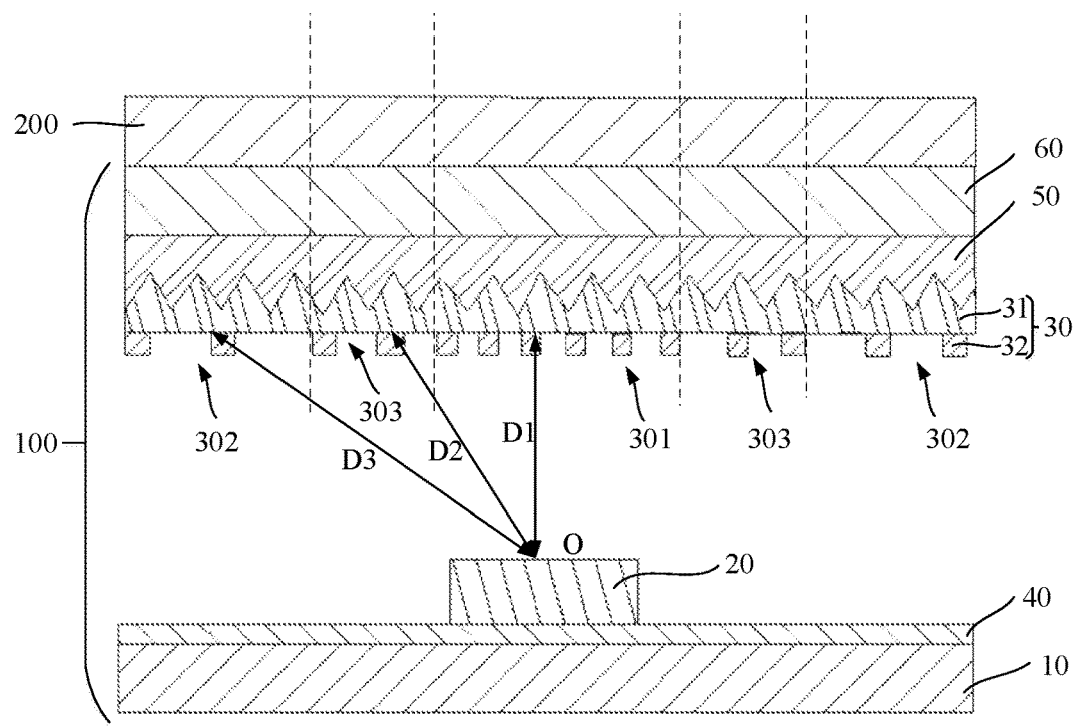
FIG. 1 is a partial sectional view of a display device provided by a preferred embodiment of the present invention
Figure 2:
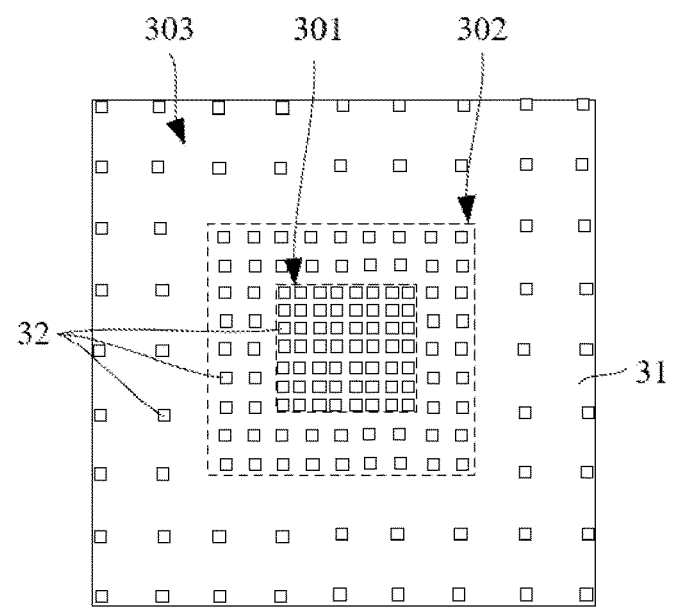
FIG. 2 is a plan view of an anti-reflection reflective composite structure in the display device shown in FIG. 1.

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

It should be understood that the orientation or position relationship indicated by the terms "up", "down" and so on is based on the orientation or position relationship shown in the attached drawings, which is only for the convenience of describing the present invention and simplifying the description, rather than indicating or implying that a device or an element must have a specific orientation, be constructed and operated in a specific orientation, so it cannot be understood as a limitation of the present invention. In addition, the terms "first" and "second" are only used for descriptive purposes and cannot be understood as indicating or implying relative importance or implicitly indicating the number of indicated technical features. Thus, the features defining "first" and "second" may explicitly or implicitly comprise one or more of the features. In the description of the present invention, "multiple" means two or more, unless otherwise specifically defined.

The present invention can repeat reference numbers and/or reference letters in different embodiments for a purpose of simplification and clarity, which itself does not indicate the relationship between the various embodiments and/or settings discussed.

A backlight structure and a display device provided by the present invention will be described in detail below in combination with specific embodiments and accompanying drawings.

Please refer to FIGS. 1-4. The present invention provides a display device 1000, which comprises a backlight structure 100 and a display panel 200, and the display panel 200 is located on a light-emitting side of the backlight structure 100. In the present invention, the backlight structure 100 is a straight down backlight structure.

In this embodiment, the display device 1000 can be a display screen, a notebook, a computer, etc.

The backlight structure 100 comprises a backplane 10, a plurality of backlight sources 20, and an anti-reflection reflective composite structure 30. The backlight sources 20 are arranged on the backplane 10 in array. The anti-reflection reflective composite structure 30 is located on a side of the backplane 10 and faces the backlight sources 20.

A material of the backplane 10 can be plastic, metal, ceramic, etc. And heat dissipation particles can also be added to the plastic, or heat dissipation film can be attached to the backplane 10.

The backlight sources 20 can be one of mini-LED backlight sources, micro-LED backlight sources, or the like.

Referring to FIG. 1, the backlight sources 20 have a luminous center O, and light of the backlight sources 20 is most concentrated at the luminous center O.

The anti-reflection reflective composite structure 30 comprises an anti-reflection film 31 and a plurality of reflection parts 32.

In an optional embodiment of the present invention, the reflection parts 32 are protrusions formed on a surface of the anti-reflection film 31 facing the backlight sources 20.

In an optional embodiment of the present invention, the reflection parts 32 are concave parts of a surface of the anti-reflection film 31 facing the backlight sources 20 recessed towards the anti-reflection film 31 (not shown in the figure).

Wherein the anti-reflection film 31 is used to enhance an intensity of a transmitted light, and the reflection parts 32 are used to reflect some light. The light incident into the anti-reflection film 31 can be reflected and refracted multiple times on a surface of the reflection parts 32, so as to further improve the utilization and transmittance of light and reduce the loss of light.

The anti-reflection film 31 is an optical composite film layer. Specifically, the anti-reflection film 31 comprises a first film layer (not shown in the figure) and a second film layer (not shown in the figure) arranged alternately. The refractive indexes of the first film layer and the second film layer are different, so that the light entering the anti-reflection film 31 can be refracted multiple times, so as to improve the transmittance of light and reduce the loss of light.

Referring to FIGS. 1-4, a distribution density of the reflection parts 32 located on a certain area of the anti-reflection film 31 is negatively correlated with a distance between the anti-reflection film 31 located in a corresponding area and a corresponding one of the backlight sources 20. That is, the greater the distance between the area on the anti-reflection film 31 and the corresponding one of the backlight sources 20, the smaller the distribution density of the reflection parts 32 located on the area. Wherein, the distance between a certain area on the anti-reflection film 31 and the corresponding one of the backlight sources 20 refers to a linear distance between any point in a certain area on the anti-reflection film 31 and the luminous center O of the corresponding backlight sources 20.

Generally speaking, the greater the distance between a certain area on the anti-reflection film 31 and the corresponding one of the backlight sources 20, the smaller the average intensity of the light emitted by the backlight sources 20 and incident into the area. This way, the amount of light emitted by the backlight sources 20 and incident on the reflection parts 32 located in an area with strong average light intensity and reflected by the reflection parts 32 on the backplane 10 is greater than the amount of light incident on the reflection parts 32 located in an area with small average light intensity and reflected by the reflection parts 32 on the backplane 10. Hence, the amount of light transmitted from the anti-reflection film 31 located in the area with strong average light can be reduced, so that the phenomenon of periodic uneven intensity of light source can be relieved.

In an optional embodiment of the present invention, the anti-reflection reflective composite structure 30 further comprises a first area 301 and an Nth area 302, and the Nth area 302 is arranged around the first area 301. Wherein, N is a positive integer and N is greater than 1. Wherein, a distance d1 between the first area 301 and the backlight sources 20 is less than a distance D3 between the Nth area 302 and the backlight sources 20, that is, an average light intensity of the light emitted by one of the backlight sources 20 in the first area 301 corresponding to the backlight sources 20 is stronger than an average light intensity in the Nth area 302 corresponding to the backlight sources 20. The distribution density of the reflection parts 32 in the first area 301 is greater than that of the reflection parts 32 in the Nth area 302.

In an optional embodiment of the present invention, the distribution density of the reflection parts 32 located in the Nth area 302 is greater than or equal to 0. That is, the reflection parts 32 can or cannot be arranged in the Nth area 302.

In an optional embodiment of the present invention, the Nth area 302 is adjacent to the first area 301, that is, the Nth area 302 is a second area, and N=2.

In an optional embodiment of the present invention, the Nth area 302 is not adjacent to the first area 301.

Specifically, the anti-reflection reflective composite structure 30 further comprises an Mth area 303, the Mth area 303 surrounds the first area 301, and the Nth area 302 surrounds the Mth area 303. Wherein, M is a positive integer, and 1<M<N. When M=N, it is equivalent to the anti-reflection reflective composite structure 30 comprising only the first area 301 and the Nth area 302. The distance D3 between the Nth area 302 and the backlight sources 20 is greater than a distance d2 between the Mth area 303 and the backlight sources 20, that is, an average light intensity of the light emitted by one of the backlight sources 20 in the Mth area 303 corresponding to the backlight sources 20 is greater than the average light intensity in the Nth area 302 and less than an average light intensity in the first area 301. A distribution density of the reflection parts 32 located in the Mth area 303 is greater than that of the reflection parts 32 located in the Nth area 302 and less than that of the reflection parts 32 located in the first area 301.

Figure 3:
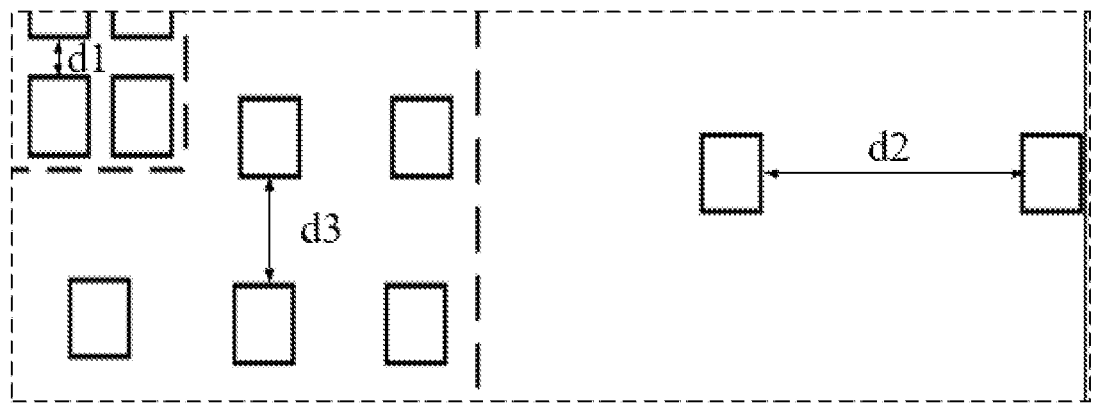
FIG. 3 is a partial enlarged view of the anti-reflection reflective composite structure shown in FIG. 2.

Referring to FIG. 3, in an optional embodiment of the present invention, distances between any two adjacent of the reflection parts 32 in the reflection parts 32 located in the first area 301 are equal and defined as d1. And distances between any two adjacent of the reflection parts 32 in the reflection parts 32 located in the Mth area 303 are equal and defined as d2. Distances between any two adjacent of the reflection parts 32 of the reflection parts 32 located in the Nth area 302 are equal and defined as d3, wherein d3<d2<d1. The distance between any two adjacent of the reflection parts 32 in a same area refers to a shortest vertical distance between adjacent outer edges of any two adjacent of the reflection parts 32.

In an optional embodiment of the present invention, the distances between any two adjacent of the reflection parts 32 in the reflection parts 32 located in the first area 301 are not equal and defined as d1. The distances between any two adjacent of the reflection parts 32 in the reflection parts 32 located in the Mth area 303 are not equal and defined as d2. The distances between any two adjacent of the reflection parts 32 of the reflection parts 32 located in the Nth area 302 are equal and defined as d3, wherein d3<d2<d1.

Specifically, in an optional embodiment of the present invention, a center of the first area 301 is directly opposite to a luminous center of the backlight sources 20, and distances between any two adjacent of the reflection parts 32 in a direction from an edge of the first area 301 to the center of the first area 301 gradually decrease. Wherein, a point defining the densest light output of the backlight sources 20 is the luminous center of the backlight sources 20, and a point on the anti-reflection film 31 directly opposite to the luminous center of the backlight sources 20 is a center of the first area 301.

Specifically, in an optional embodiment of the present invention, distances between any two adjacent of the reflection parts 32 located from an edge of the Mth area 303 to the center of the first area 301 gradually decrease.

Specifically, in an optional embodiment of the present invention, distances between any two adjacent of the reflection parts 32 in a direction from an edge of the Nth area 302 to the center of the first area 301 gradually decrease.

In an optional embodiment of the present invention, the reflection parts 32 located in at least one area of the first area 301, the Mth area 303, and the Nth area 302 are arranged in an array.

Specifically, in an optional embodiment of the present invention, the reflection parts 32 located in the first area 301 are arranged in an array.

Specifically, in an optional embodiment of the present invention, the reflection parts 32 located in the Mth area 303 are arranged in an array.

Specifically, in an optional embodiment of the present invention, the reflection parts 32 located in the Nth area 302 are arranged in an array.

Specifically, in this embodiment, M=2, N=3, that is, the Mth area 303 is a second area, and the Nth area 302 is a third area. A distribution density of the reflection parts 32 located in the third area is less than that of the reflection parts 32 located in the second area, and the distribution density of the reflection parts 32 located in the second area is less than that of the reflection parts 32 located in the first area 301.

In an optional embodiment of the present invention, the Nth area 302 and/or the Mth area 303 are (is) circular, rectangular, or multilateral. That is, the reflection parts 32 located in the Nth area 302 and/or the Mth area 303 are distributed in a circular ring, a rectangular ring, or a multilateral ring.

Referring again to FIG. 1, in an optional embodiment of the present invention, the backlight structure 100 further comprises a reflection layer 40. the reflection layer 40 is arranged on the backplane 10 and arranged between the backplane 10 and the backlight sources 20, and the backlight sources 20 are arranged on the reflection layer 40. In other embodiments, the backlight sources 20 are arranged on the backplane 10 and surrounded by the reflection layer 40.

Referring again to FIG. 1, the backlight structure 100 further comprises a diffusion plate 50 and a backlight function diaphragm 60, the diffusion plate 50 is formed on a side of the anti-reflection reflective composite structure 30 away from the backplane 10, and the backlight function diaphragm 60 is formed on the diffusion plate 50. Wherein, the backlight functional diaphragm 60 can be at least one of functional diaphragms such as diffusion sheet, prism sheet, lens sheet, and reflector.

Figure 4:
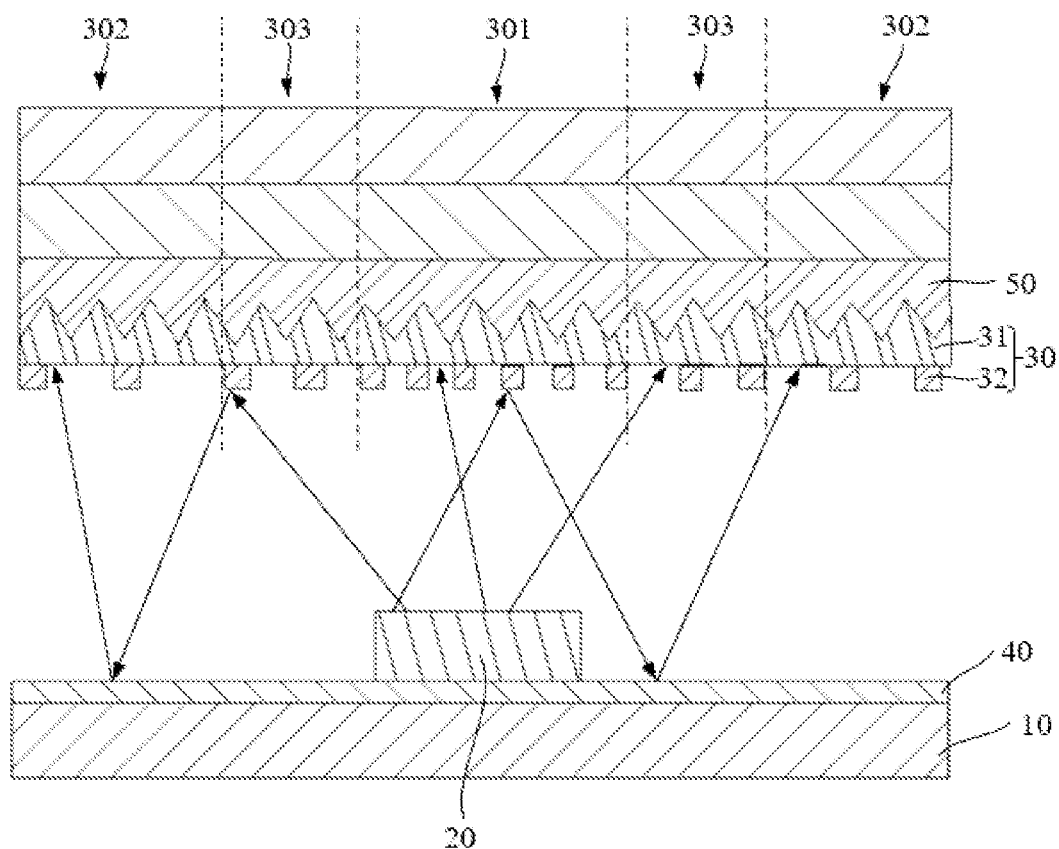
FIG. 4 is a light path diagram of part of a light emitted by backlight sources in the display device shown in FIG. 1 on an anti-reflection reflective composite structure.

Please refer to FIG. 4. FIG. 4 is a light path diagram of part of the light emitted by the backlight sources in the display device shown in FIG. 1 on an anti-reflection reflective composite structure. The backlight sources 20 emit light, and a first part of the light is incident on the reflection parts 32 located in the first area 301 and reflected by the reflection parts 32 to the reflection layer 40 of the backlight structure 100, and enters the Nth area 302 and/or the Mth area 303 after being reflected on the reflection layer 40 at least once. A second part of the light is incident on the reflection parts 32 located in the Mth area 303 and reflected by the reflection parts 32 to the reflection layer 40 of the backlight structure 100, and enters the Nth area 302 after being reflected on the reflection layer 40 at least once. A third part of the light is incident into a gap between two adjacent of the reflection parts 32 located in the first area 301, and is incident to the diffusion plate 50 through the anti-reflection film 31. A fourth part of the light is incident into the gap between two adjacent of the reflection parts 32 located in the Mth area 303, and is incident to the diffusion plate 50 through the anti-reflection film 31. A fifth part of the light is incident into the gap between two adjacent of the reflection parts 32 located in the Nth area 302, and is incident to the diffusion plate 50 through the anti-reflection film 31.

The backlight structure and the display device are provided by the present invention. An anti-reflection reflective composite structure is added between the backlight sources and the diffusion plate of the backlight structure, and the anti-reflection reflective composite structure comprises an anti-reflection film and a plurality of reflection parts formed on a surface of the anti-reflection film facing the backlight sources and the reflection layer, and the anti-reflection reflective composite structure comprises a first area and an Nth area, and the Nth area is arranged around the first area. Wherein N is a positive integer and N is greater than 1. A distance from the first area to the backlight sources is less than a distance from the Nth area to the backlight source. Since the greater a distance between a certain area on the anti-reflection film and a corresponding one of the backlight sources, the smaller a distribution density of the reflection parts located on the area, therefore, the number of light rays emitted and incident on the reflection parts located in the first area and reflected by the reflection parts to the backplane is more than the number of light rays incident on the reflection parts located in the Nth area and reflected by the reflection parts to the backplane. Hence, the amount of light transmitted from the anti-reflection film located in the first area can be reduced, so that the periodic uneven intensity of the light sources can be relieved.

In addition, the reflection layer is arranged on the backplane, and the light incident into the first area and reflected by the reflection parts can be reflected into the Nth area on the reflecting layer and penetrate from the anti-reflection film located in the Nth area, which can further increase the number of light rays passing through the anti-reflection film located in the Nth area, which can not only further relieve the periodic uneven intensity of the light source, but also reduce the loss of light, so as to improve the product quality and customer perception.

The backlight structure and the display device provided by the embodiments of the present invention are introduced in detail. In this paper, specific examples are applied to elaborate the principle and embodiment of the invention. The description of the above embodiment is only used to help understand the technical scheme and core idea of the invention. Those of ordinary skill in the art should understand that they can still modify the technical scheme recorded in the above embodiments, or equivalent replace some of the technical features. These modifications or substitutions do not separate the essence of the corresponding technical scheme from the scope of the technical scheme of each embodiment of the present invention.

What is claimed is:

1. A backlight structure, comprising a backplane and a plurality of backlight sources, and the plurality of the backlight sources being arranged on the backplane in an array; wherein the backlight structure further comprises:
    an anti-reflection film, arranged on sides of the plurality of the backlight sources away from the backplane; and
    a plurality of reflection parts, formed on a surface of the anti-reflection film facing the backlight sources, wherein the reflection parts are protrusions formed on the surface of the anti-reflection film facing the backlight sources, and the plurality of reflection parts form an anti-reflection reflective composite structure with the anti-reflection film;
    wherein the greater a distance between a certain area on the anti-reflection film and a corresponding one of the backlight sources, the smaller a distribution density of the reflection parts located on the area.

2. The backlight structure of claim 1, wherein the anti-reflection film comprises a first area, an Mth area, and an Nth area, the Mth area surrounds the first area, and the Nth area surrounds the Mth area; wherein M and N are positive integers, both M and N are greater than 1, and 1<M<N; a distance between the first area and the backlight sources is less than a distance between the Nth area and the backlight sources and a distance between the Mth area and the backlight sources, and the distance between the Nth area and the backlight sources is greater than to the distance between the Mth area and the backlight sources; and
    a distribution density of the reflection parts located in the Mth area is greater than a distribution density of the reflection parts located in the Nth area, and is less than a distribution density of the reflection parts located in the first area.

3. The backlight structure of claim 2, wherein the distribution density of the reflection parts located in the Nth area is greater than or equal to 0.

4. The backlight structure of claim 2, wherein distances between any two adjacent ones of the reflection parts located in the first area are unequal, distances between any two adjacent ones of the reflection parts located in the Mth area are unequal, and distances between any two adjacent ones of the reflection parts located in the Nth area are equal, wherein a distance between any two adjacent ones of the reflection parts located in the Mth area is greater than a distance between any two adjacent ones of the reflection parts located in the first area, and less than a distance between any two adjacent ones of the reflection parts located in the Nth area.

5. The backlight structure of claim 4, wherein a center of the first area is directly opposite to a luminous center of the backlight sources, and distances between any two adjacent ones of the reflection parts in a direction from an edge of the first area to the center of the first area gradually decrease.

6. The backlight structure of claim 4, wherein distances between any two adjacent ones of the reflection parts located from an edge of the Mth area to a center of the first area gradually decrease.

7. The backlight structure of claim 6, wherein distances between any two adjacent ones of the reflection parts in a direction from an edge of the Nth area to the center of the first area gradually decrease.

8. The backlight structure of claim 4, wherein the reflection parts located in at least one area of the first area, the Mth area, and the Nth area are arranged in an array.

9. The backlight structure of claim 2, wherein the Nth area is a circular ring, a rectangular ring, or a multilateral ring.

10. The backlight structure of claim 1, wherein the backlight structure further comprises a reflection layer, the reflection layer is arranged on the backplane and is located between the backplane and the backlight sources; alternatively,
the reflection layer is arranged on the backplane and surrounds the backlight sources.

11. A display device, wherein the display device comprises a display panel and a backlight structure, and the display panel is located on a light emitting side of the backlight structure; the backlight structure comprises a backplane and a plurality of backlight sources, and the plurality of backlight sources being arranged on the backplane in an array; wherein the backlight structure further comprises:
an anti-reflection film, arranged on sides of the plurality of the backlight sources away from the backplane; and
a plurality of reflection parts, formed on a surface of the anti-reflection film facing the backlight sources, wherein the reflection parts are protrusions formed on the surface of the anti-reflection film facing the backlight sources, and the plurality of reflection parts form an anti-reflection reflective composite structure with the anti-reflection film;
wherein the greater a distance between a certain area on the anti-reflection film and a corresponding one of the backlight sources, the smaller a distribution density of the reflection parts located on the area.

12. The display device of claim 11, wherein the anti-reflection film comprises a first area, an Mth area, and an Nth area, the Mth area surrounds the first area, and the Nth area surrounds the Mth area; wherein M and N are positive integers, both M and N are greater than 1, and 1<M<N; a distance between the first area and the backlight sources is less than a distance between the Nth area and the backlight sources and a distance between the Mth area and the backlight sources, and the distance between the Nth area and the backlight sources is greater than the distance between the Mth area and the backlight sources; and
a distribution density of the reflection parts located in the Mth area is greater than or equal to a distribution density of the reflection parts located in the Nth area, and is less than a distribution density of the reflection parts located in the first area.

13. The display device of claim 12, wherein the distribution density of the reflection parts located in the Nth area is greater than 0.

14. The display device of claim 12, wherein distances between any two adjacent ones of the reflection parts located in the first area are unequal, distances between any two adjacent ones of the reflection parts located in the Mth area are unequal, and distances between any two adjacent ones of the reflection parts located in the Nth area are equal, wherein a distance between any two adjacent ones of the reflection parts located in the Mth area is greater than a distance between any two adjacent ones of the reflection parts located in the first area, and less than a distance between any two adjacent ones of the reflection parts located in the Nth area.

15. The display device of claim 14, wherein a center of the first area is directly opposite to a luminous center of the backlight sources, and distances between any two adjacent ones of the reflection parts in a direction from an edge of the first area to the center of the first area gradually decrease.

16. The display device of claim 14, wherein distances between any two adjacent ones of the reflection parts located from an edge of the Mth area to a center of the first area gradually decrease.

17. The display device of claim 16, wherein distances between any two adjacent ones of the reflection parts in a direction from an edge of the Nth area to the center of the first area gradually decrease.

18. The display device of claim 14 wherein the reflection parts located in at least one area of the first area, the Mth area, and the Nth area are arranged in an array.

* * * * *